(12) United States Patent
Mak et al.

(10) Patent No.: US 9,037,487 B2
(45) Date of Patent: May 19, 2015

(54) FLOOR PRICE MANAGEMENT IN AN ONLINE AUCTION SYSTEM FOR ADS TO BE PLACED IN A DIVERSIFIED CONTENT INVENTORY

(71) Applicant: Hulu, LLC, Santa Monica, CA (US)

(72) Inventors: Wing Chit Mak, Los Angeles, CA (US); Jean-Paul Colaco, Manhattan Beach, CA (US)

(73) Assignee: HULU, LLC, Santa Monica, CA (US)

( * ) Notice: Subject to any disclaimer, the term of this patent is extended or adjusted under 35 U.S.C. 154(b) by 52 days.

(21) Appl. No.: 13/673,783

(22) Filed: Nov. 9, 2012

(65) Prior Publication Data

US 2014/0136336 A1    May 15, 2014

(51) Int. Cl.
   *G06Q 30/02*    (2012.01)
(52) U.S. Cl.
   CPC .................................. *G06Q 30/0275* (2013.01)
(58) Field of Classification Search
   CPC .................................................. G06Q 30/0275
   USPC ....................................................... 705/14.71
   See application file for complete search history.

(56) References Cited

U.S. PATENT DOCUMENTS

| | | | |
|---|---|---|---|
| 7,933,798 B1* | 4/2011 | Yan et al. ..................... | 705/14.45 |
| 8,170,913 B1* | 5/2012 | Baluja ......................... | 705/14.43 |
| 2001/0014876 A1 | 8/2001 | Miyashita | |
| 2002/0002525 A1 | 1/2002 | Arai et al. | |
| 2006/0271389 A1* | 11/2006 | Goodman ......................... | 705/1 |
| 2006/0271429 A1* | 11/2006 | Borgs et al. ...................... | 705/14 |
| 2008/0021791 A1* | 1/2008 | Steelberg et al. ............... | 705/26 |
| 2008/0046917 A1 | 2/2008 | De Heer | |
| 2008/0195458 A1* | 8/2008 | Anschutz et al. ............... | 705/10 |
| 2008/0255921 A1* | 10/2008 | Flake et al. ..................... | 705/10 |
| 2010/0293047 A1* | 11/2010 | Schwarz et al. ............ | 705/14.42 |
| 2011/0231242 A1* | 9/2011 | Dilling et al. .............. | 705/14.42 |
| 2013/0097028 A1* | 4/2013 | Han et al. ................... | 705/14.71 |

FOREIGN PATENT DOCUMENTS

| JP | 3930040 B1 | 6/2007 |
|---|---|---|
| KR | 1020120076605 A | 7/2012 |

OTHER PUBLICATIONS

"Google's Auction for TV Ads" S. Albers et al. (Eds.): ICALP 2009, Part II, LNCS 5556, pp. 309-327, 2009. Springer-Verlag Berlin Heidelberg 2009.*
"Impression Share: The Little Known Metric with Big Impact" (2007-2008) ClickEquations.com.*
International Search Report from International Application No. PCT/US2013/067216 mailed Feb. 12, 2014.

* cited by examiner

*Primary Examiner* — Thomas M Hammond, III
*Assistant Examiner* — Breffni X Baggot
(74) *Attorney, Agent, or Firm* — Fountainhead Law Group PC

(57) ABSTRACT

An auction for ad inventory to be placed in streaming video content is characterized by a floor (minimum) price. A seller component receives, via a real time auction exchange system, a request for a set of ad impressions meeting specified criteria to be delivered by an online video streaming system, sometimes referred to as an "auction lot". The seller component determines a floor price based on an inventory pressure calculated for the auction lot in response to receiving the request. The seller component determines the inventory pressure based on an inventory pressure determined for an inventory segment identified by the auction lot. The auction lot may then be entered into a bidding process including at least one bidder wherein bids less than the floor price are not accepted.

26 Claims, 10 Drawing Sheets

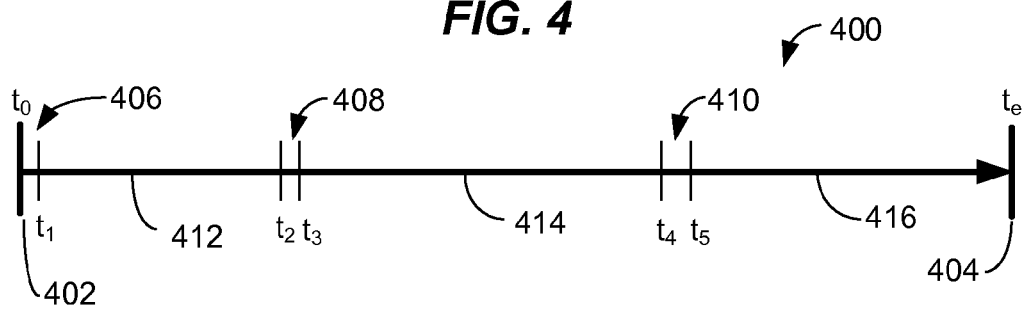
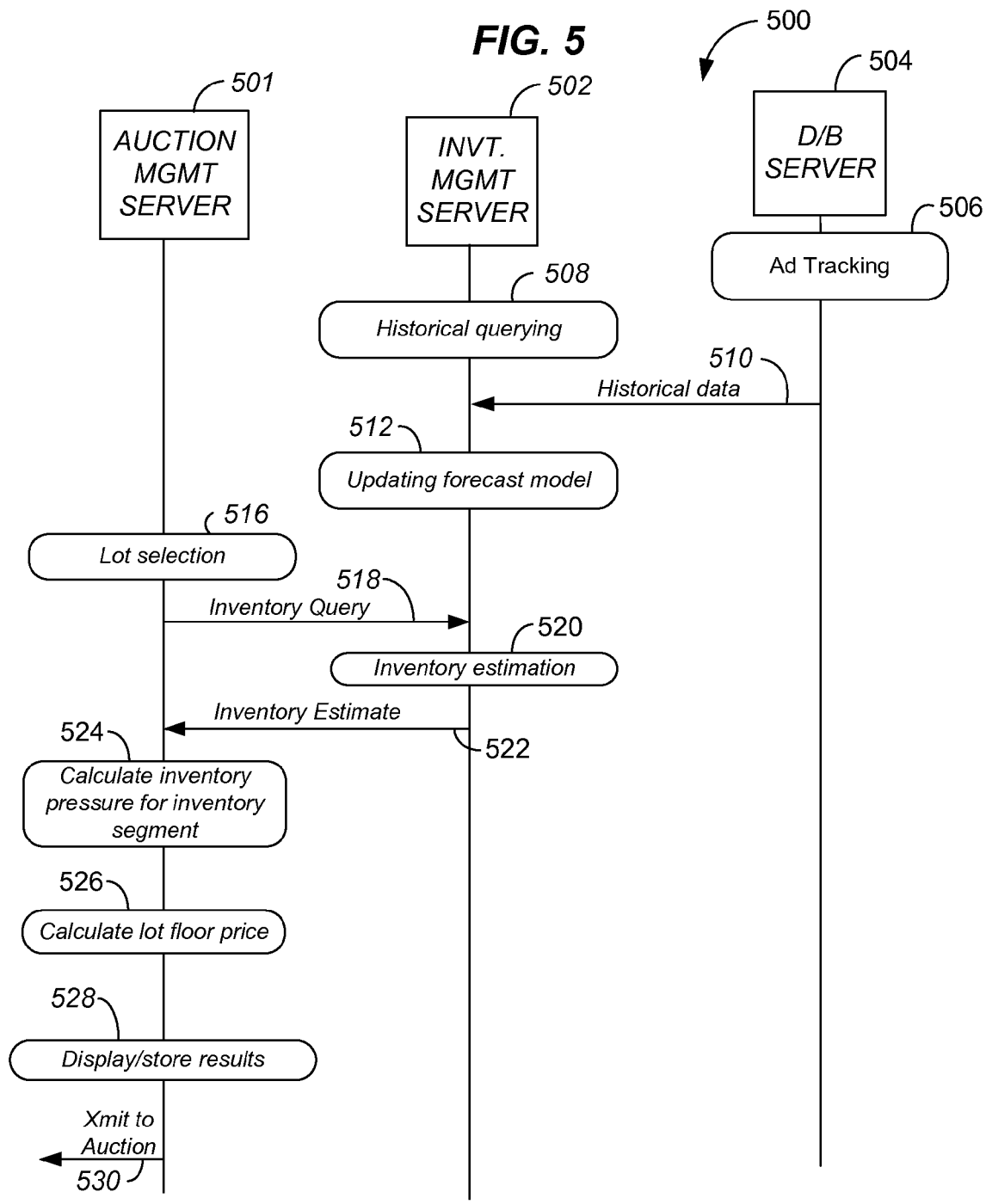

710 — TRACK AD IMPRESSIONS IN RELATION TO DETECTED ATTRIBUTES

720 — EXTRAPOLATE HISTORICAL DATA OVER FUTURE TIME PERIOD BASED ON PROGRAM SCHEDULE, ASSUMING CONTINUATION OF PAST USER BEHAVIORS

730 — DETERMINE TOTAL IMPRESSIONS IN TARGETED SEGMENT

740 — DETERMINE UNSOLD (AVAILABLE) IMPRESSIONS IN THE SEGMENT

750 — DEFINE AUCTION LOT

810 — RECEIVING, BY A COMPUTER, A REQUEST FOR AN AUCTION LOT OF VIDEO ADVERTISEMENTS WITHIN AN INVENTORY SEGMENT OF VIDEO AD INVENTORY FOR DISTRIBUTION WITH ONE OR MORE EPISODES OF ONE OR MORE VIDEO PROGRAMS VIA A STREAMING VIDEO SYSTEM

820 — DETERMINING, IN A MEMORY OF THE COMPUTER, A MEASURE OF INVENTORY PRESSURE FOR THE AUCTION LOT IN RESPONSE TO RECEIVING THE REQUEST, BASED ON AN AGGREGATE SHARE OF VOICE FOR ONE OR MORE AD CAMPAIGNS ALLOCATED TO THE INVENTORY SEGMENT

830 — CALCULATING, IN A MEMORY OF THE COMPUTER, A FLOOR PRICE FOR THE AUCTION LOT BASED ON THE MEASURE OF INVENTORY PRESSURE

840 — PROVIDING INFORMATION DEFINING THE FLOOR PRICE AND THE AUCTION LOT TO AN AUCTION SYSTEM

910 — DEFINING THE AUCTION LOT BASED ON A TOTAL NUMBER OF IMPRESSIONS WITHIN A SPECIFIED TIME PERIOD AND ON TARGETING ATTRIBUTE DATA DEFINING THE INVENTORY SEGMENT

920 — DETERMINING THE AGGREGATE SHARE OF VOICE, COMPRISING ESTIMATING A PROJECTED TOTAL NUMBER OF AD IMPRESSIONS IN THE INVENTORY SEGMENT DURING THE SPECIFIED TIME PERIOD, BASED UPON ELECTRONIC VIEWERSHIP RECORDS FOR PAST EPISODES OF THE ONE OR MORE VIDEO PROGRAMS IN THE STREAMING VIDEO SYSTEM

930 — ESTIMATING THE PROJECTED TOTAL NUMBER OF AD IMPRESSIONS IN THE INVENTORY SEGMENT DURING THE SPECIFIED TIME PERIOD COMPRISES QUERYING A DATABASE OF THE ELECTRONIC VIEWERSHIP RECORDS

940 — DETERMINING THE AGGREGATE SHARE OF VOICE FURTHER COMPRISES ESTIMATING A NUMBER OF AD IMPRESSIONS THAT WILL BE ALLOCATED TO EACH OF THE ONE OR MORE AD CAMPAIGNS IN THE INVENTORY SEGMENT DURING THE SPECIFIED TIME PERIOD

DETERMINING THE MEASURE OF INVENTORY PRESSURE COMPRISES CALCULATING A RATIO A/B, WHEREIN 'A' INDICATES A SUM OF THE NUMBER OF AD IMPRESSIONS THAT WILL BE ALLOCATED TO EACH OF THE ONE OR MORE AD CAMPAIGNS IN THE INVENTORY SEGMENT DURING THE SPECIFIED TIME PERIOD, AND 'B' INDICATES THE PROJECTED TOTAL NUMBER OF AD IMPRESSIONS IN THE INVENTORY SEGMENT DURING THE SPECIFIED TIME PERIOD (A)

DETERMINING THE MEASURE OF INVENTORY PRESSURE COMPRISES CALCULATING THE RATIO A/B TO BE A NUMERIC VALUE WITHIN A RANGE OF ZERO TO AT LEAST ONE, WHEREIN ZERO INDICATES THERE IS NO COMPETING DEMAND FOR THE INVENTORY SEGMENT, ONE INDICATES THERE IS NO UNCOMMITTED INVENTORY IN THE INVENTORY SEGMENT, AND A NUMBER GREATER THAN ONE INDICATES THE INVENTORY SEGMENT IS OVERSOLD

( CALCULATING THE FLOOR PRICE )

1110

CALCULATING THE FLOOR PRICE AS A NUMERIC FUNCTION OF THE INVENTORY PRESSURE

1120

WHEREIN THE NUMERIC FUNCTION COMPRISES A STEP FUNCTION

1130

CALCULATING THE FLOOR PRICE AS A NUMERIC FUNCTION OF THE INVENTORY PRESSURE AND AN AGGREGATE MARKET PRICE FOR THE INVENTORY SEGMENT

1140

DETERMINING THE AGGREGATE MARKET PRICE IN THE INVENTORY SEGMENT, BASED ON RECORDS OF PAST SALES

FLOOR PRICE MANAGEMENT IN AN ONLINE AUCTION SYSTEM FOR ADS TO BE PLACED IN A DIVERSIFIED CONTENT INVENTORY

FIELD

The present application relates generally to input/output processing using a computer, and more particularly to floor price management in an online auction system for ads to be placed in a diversified content inventory of an online video system.

BACKGROUND

Advertising-supported distribution of audio-video data may be implemented from a content server to remote client devices over computer networks, telecommunications networks, and combinations of such networks, using various methods, for example progressive downloading or streaming. Platforms for such distribution may include sites that offer a great variety of different programming, including both newly released episodes of serial programs, major features, documentaries, special events, archives of past episodes and classic serial programs, of different types targeted to users having various different demographic profiles or located in different areas, and in various formats for use on different kinds of player devices. One or more video ads may be inserted into each video program and sold to advertisers who are charged based on how many times each advertisement is played on a client device; i.e., for each video ad impression.

The ad "impression" may be used as a fundamental unit by which to measure advertising for commercial purposes. Although it may be defined in various ways depending on the context and purpose of measurement, in a general sense an ad impression may be understood as an event in which a person is in some sense exposed to or "impressed" with a discrete advertising message. In the context of video advertising, the event of completing the output of a defined portion or all of a video advertisement on a client device may be counted as one or more impressions, depending on the number of people viewing or likely to be viewing the device. For example, completing output of a video ad on a notepad device likely to be viewed by one person may be counted as a single impression, while completing output of a video ad on a video scoreboard of a stadium during an event attended by thousands of people may be counted as many impressions based on the attendance figures for the event.

However advertising is measured, it is generally sold prospectively; that is, before the purchased impressions actually occur. Accordingly, both buyer and seller rely on estimates of future value to settle on a transaction price. In a video streaming system or analogous interactive online advertising system, the system operator may control access to records of advertising impressions, and thus may equip itself with superior insight into the advertising metrics that are likely to be realized by every advertising lot sold. The buyer, on the other hand, may have superior knowledge of advertising effectiveness based on its past experience with similar ad purchases, and may be able to better discern market prices by obtaining competing offers. The buyer and seller may elect to share information with each other in the process of a negotiated sale and purchase of a lot of video advertising.

A substantial portion of video advertising may be sold through such negotiated exchanges between a buyer and seller. In essence, the negotiated exchange enables the buyer and seller to reach a mutually beneficial price, if it is possible to do so. For the ad buyer, an acceptable price may be any price at which the cost of the advertising lot is less than or equal to (including all indirect benefits of contracting with the ad seller) what may be obtained from a competing ad seller (if any), while also being less than the marginal benefit the ad buyer expects to receive from purchasing the ads. For the ad seller, an acceptable price may be any price not less than (including all indirect benefits of contracting with the ad buyer) can be obtained from competing ad buyers (if any), which is also greater than the cost of providing the advertising lot. Both the seller and buyer also experience a certain transaction cost associated with the negotiation process. Although ad sellers may find direct negotiations useful for selling a substantial portion of inventory, sellers may also regularly experience inventory surpluses that cannot feasibly be sold through negotiated exchanges.

A seller may use various methods to dispose of such surpluses, including, for example, using the inventory for the seller's promotional purposes, lowering the number of ads supplied with content to improve user experience, or selling the surplus inventory using an auction transaction, wherein prospective buyers are invited to bid on various inventory lots, typically through an on-line bidding system. The ad seller may define parameters of the auctioned lots and set reserve or minimum pricing, sometimes referred to as a "floor price." The floor price may be known to the bidders, or kept secret until after the bidding is completed. If the floor price is known in advance, bidding may begin at the floor price; if there are no bids then the lot goes unsold. If the floor price is initially secret, bidding begins at any amount and continues until no more bids are offered. If the final bid is equal to or greater than the floor price, the lot is sold at the final bid price; if the final bid is less than the floor price, the lot goes unsold.

Generally, the ad seller may elect not to use the auction to unload surplus inventory at any price; or even at any price above marginal cost. Overly drastic discounting of ad inventory may be undesirable for many reasons. For example, auctions closing at too low of a price may, over time, tend to depress the market price and lead to an excess of advertising in the online system. Conversely, setting too high a floor price may discourage bidding or result in underutilization of the ad distribution system. Prior approaches to setting floor pricing for ad inventory may be either overly crude or rely too much on guesswork by experienced managers.

Consequently, prior methods of managing ad inventory auctions, including setting reserve prices and related operations, may result in placing too high or too low a valuation on ad inventory made available for disposal at auction. These and other limitations of prior methods for managing auctioning of ads to be placed in a diversified content inventory of an online video system may be overcome by the novel methods and apparatus disclosed herein.

SUMMARY

Methods, apparatus and systems for managing auctioning of ads to be placed in a diversified content inventory of an online video system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for managing a floor price in an auction of video ad inventory for distribution in an online video system may include receiving, by a computer, a request for an auction lot of video advertisements within an inventory segment of video ad inventory for distribution with one or more episodes of one or more video programs via a streaming video system. The method may further include determining, in a memory of the computer, a measure of inventory pressure for the auction lot in response to receiving the request, based on an aggregate share of voice for one or more ad campaigns allocated to the inventory segment. As used herein, "inventory pressure" refers to a measure of demand for ads in a defined inventory segment of an ad system. Inventory pressure may be related to share of voice, in that inventory pressure for a prospective targeted segment may be determined by summing a share of voice for committed (e.g., sold) ad campaigns in the segment. The method may further include calculating, in a memory of the computer, a floor price for the auction lot based on the measure of inventory pressure, and providing information defining the floor price and the auction lot to an auction system.

In an aspect, the method may further include defining the auction lot based on a total number of impressions within a specified time period defined for the auction lot and on targeting attribute data defining the inventory segment. In another aspect, the method may further include determining the aggregate share of voice at least in part by estimating a projected total number of ad impressions in the inventory segment during the specified time period, based upon electronic viewership records for past episodes of the one or more video programs in the streaming video system. Estimating the projected total number of ad impressions in the inventory segment during the specified time period may include querying a database of the electronic viewership records. Determining the aggregate share of voice may further include estimating a number of ad impressions that will be allocated to each of the one or more ad campaigns in the inventory segment during the specified time period.

In another aspect, the method may include determining the measure of inventory pressure comprises calculating a ratio A/B, wherein 'A' indicates a sum of the number of ad impressions that will be allocated to each of the one or more ad campaigns in the inventory segment during the specified time period, and 'B' indicates the projected total number of ad impressions in the inventory segment during the specified time period. The ratio A/B may be, or may include, a numeric value within a range of zero to at least one, wherein zero (0) indicates there is no competing demand for the inventory segment, one (1) indicates there is no uncommitted inventory in the inventory segment, and a number greater than one indicates the inventory segment is oversold.

In another aspect, the method may include calculating the floor price as a numeric function of the inventory pressure. Various functions may be used; for example, the floor price may be calculated as a step function based on the inventory pressure. In addition, or in the alternative, the method may include calculating the floor price as a numeric function of the inventory pressure and an aggregate market price for the inventory segment. The method may include determining the aggregate market price in the inventory segment, based on records of past sales.

In another aspect, the method may include setting a minimum price for the auction lot equal to the floor price. In such case, the method may also include auctioning the auction lot by accepting electronic bids received over a computer network, and rejecting any bid that is less than the floor price, until a maximum bid greater than the floor price is received prior to close of bidding.

In related aspects, a computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for managing auctioning of ads to be placed in a diversified content inventory of an online video system are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. Like element numerals may be used to indicate like elements appearing in one or more of the figures.

FIG. 4 is a line diagram illustrating aspects of a video segment including ad breaks.

FIG. 5 is a sequence diagram illustrating an example of a call flow between system components in a sequence for management of ad inventory auctioning in a video streaming system.

FIG. 7 is a diagram illustrating operations that may be performed by a computer server for defining an auction lot of ad inventory in a video streaming system.

FIGS. 8-12 are diagrams illustrating operations that may be performed by a computer server for managing an auction of ad inventory for a video streaming system, including determining a floor price.

DETAILED DESCRIPTION

Figure 1:
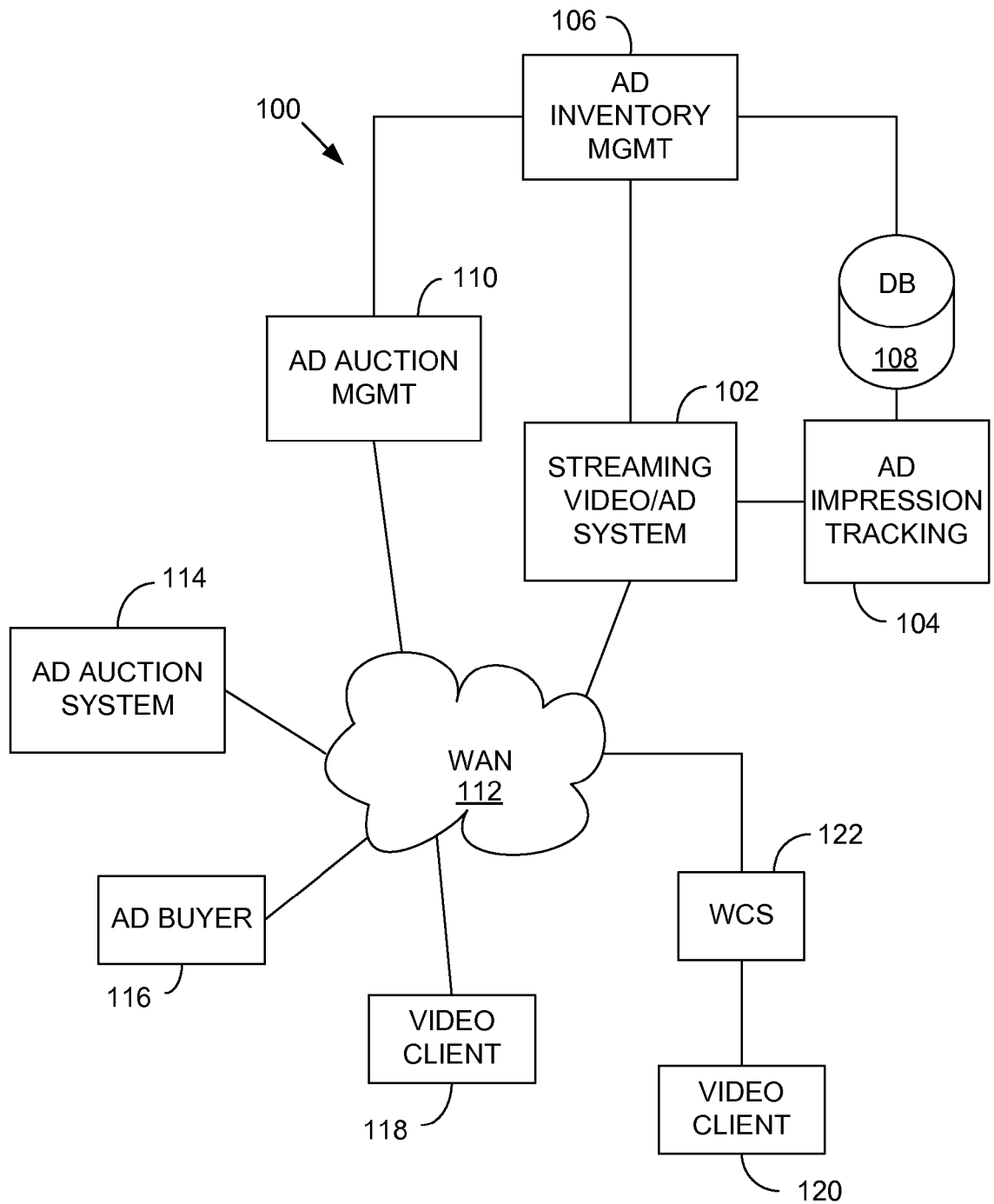
FIG. 1 is a schematic diagram illustrating an embodiment of a computing environment in which systems and methods discussed herein may be implemented.

In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented within a system 100 including a video streaming system 102 in communication with multiple client devices via one or more communication networks.

In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Streaming may enable immediate playback at any point within the file. End-users may skip through the media file to start playback or change playback to any point in the media file. Unlike progressive downloading, which may require downloading the entire file or downloading enough of the entire file to start playback at the beginning, the end-user does not need to wait for the file to download in a predetermined sequence. Typically, streaming media is delivered from a few dedicated servers having high bandwidth capabilities.

A streaming media server 100 may be defined as a specialized device that accepts requests for video files, and based on information about the format, bandwidth and structure of those files, serves an amount of data necessary to play the video, at the rate needed to play it. Streaming media servers may also account for the transmission bandwidth and capabilities of the media player on the destination client. Unlike the web server, the streaming media server communicates with the client device using control messages and data messages to adjust to changing network conditions as the video is played. These control messages may include commands for enabling control functions such as fast forward, fast reverse, pausing, or seeking to a particular part of the file at the client. Since a streaming media server may transmit video data only as needed and at the rate that is needed, precise control over the number of streams served can be maintained. Streaming media servers may also enable monitoring and tracking of who is viewing what video programs and how long they are watched. In a streaming system, a media player component on the client device may be configured track use of the content and disable capture or storage of the streamed content, to prevent or discourage unauthorized copying.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program. Streaming media players at the client do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model, sponsors pay for the presentation of the media program in exchange for the right to present advertisements during or adjacent to the presentation of the program. In some models, advertisements are inserted at predetermined times in a video program, which times may be referred to as "ad breaks." An ad break reserved for one or more video ads to be played in uninterrupted sequence may also be referred to as an "ad pod." With streaming video, the media player may be configured so that the client device cannot play the video without also playing predetermined advertisements during the designated ad breaks.

For example, a video streaming and associated auction management system 100 may include one or more operative modules 102, 104, 106, 108 and/or 110 distributed over one or more computers. Each module 102, 104, 106 and 110 may include, or may be operatively coupled to, one or more data stores, for example database 108, indexes, files, or other data structures. A video content server 102 may access a data store of various video segments; for example, newly released and archived television episodes, motion pictures, and other content produced as primary content of interest to consumers. The video content/advertising module 102 may serve the video segments as directed by a user interface controller (not shown). The video streaming system 100 may include other modules or units not depicted in FIG. 1, for example administrative servers, commerce servers, network infrastructure, advertising selection engines, and so forth.

The video content/advertising module 102 may also access a data store of relatively short video segments (e.g., 10 second, 30 second, or 60 second video advertisements) configured as advertising for a particular advertiser or message. The advertising may be provided for an advertiser in exchange for payment of some kind, or may comprise a promotional message for an operator of the system 100, a public service message, or some other information. The video content/ad module 102 may serve the video advertising segments as directed by the user interface controller.

An advertising tracking module 110 may keep track of program and advertising views for video content and advertising streamed from the system 102 to client devices. Client devices may be configured to transmit a first signal, sometimes referred to as a "start beacon" to ad tracker 104 at the onset of each video segment playing on the client. Similarly, the client may transmit a second signal, sometime called an "end beacon" to the system when a video segment has finished playing on the client device. The ad tracking module 104 may process start and end beacons for video ads received by the system 100, together with information concerning the video, program, user profiles, client device, use history, location, or other attributes which with each beacon is associated. The module 104 may then generate and store records regarding video advertising views related to program type, program identifier, user demographic, location of client device or user account, player device type, and other associated information. The ad tracking module 104 may store these records in a data structure, for example in a relational database 108.

The video streaming system 100 may include, or be communicatively coupled to, an ad inventory management module 106. The ad inventory management module may be communicatively coupled to one or more network nodes 116 for prospective ad buyers via WAN 112 or other connection. The ad buyer node 116 may operate a terminal interface or message system for communicating with the ad inventory module 106. A person wishing to purchase distribution of a particular video ad or set of video ads for an ad campaign may send an inquiry to the ad inventory management module 106, based on parameters as more particularly described herein. The ad inventory management module 106 may receive and process such queries to determine available ad inventory and provide estimates in response to such queries. During such processing, the inventory management module 106 may communicate with the ad tracker 104 and/or the database 108 to obtain access to historical data concerning video advertising views in relation to specific programs, user demographics or other targeted attributes. The inventory management server may use the historical data to provide a basis for estimating ad inventory for some defined future time period.

As used herein, "ad inventory" does not refer to a definite, countable quantity of already-produced items such as might be stored in a warehouse. Each ad impression made by a streaming video ad is consumed the instant it is produced in response to variable consumer demand, so there can no store of inventory. Instead, as understood in the art and as used herein, "ad inventory" refers to a quantity of future ad impressions estimated to be available in a streaming video system during some defined future time period. Estimations may be based on a current state of the system, historical data regarding ad impressions, and/or other parameters. Ad inventory may be restricted to and thereby partly defined by targeted attributes including selected demographic, geographic, program, device type, or other targeted parameters. For example, ad inventory may be estimated for video programs targeted to a particular geographic region, user demographic, program genre, program assumed viewer profile, data format, client type, time-of-day, or any other attribute useful for targeting advertising.

The system 100 may further include an ad auction management module 110, which may be coupled to the inventory management module 106. The ad auction management module 110 may communicate with a separate auction system 114 providing auction services for one or more video or other advertising suppliers. Prospective ad buyers such as using ad buyer nodes 116 may communicate with the auction system 106 to review available auction lots and bid on the lots during designated auction periods. The ad auction management module 110 may operate to determine key parameters of auction lots to be auctioned by the auction system 114. Key parameters may include, for example, one or more attributes defining lots of ad inventory to be auctioned, with respective auction floor prices to be applied for each of the lots. The auction management module 110 may define auction lots and associated floor prices using algorithms and operations as described in more detail herein. In addition, the management module 110 may coordinate data for prospective and completed auctions between the auction system 114 and the ad inventory management module 106 or other components of the video streaming system 100. Once ads are purchased via a negotiating or auction process, and produced ads are supplied to the system 100 as directed by the respective ad buyer 116, the system 100 may include the ads in video content streamed to clients 118, 120, until the purchased allotment of advertising has been delivered.

The video streaming system 100 may connect to a data communication network 112. A data communication network 112 may comprise a local area network (LAN), a wide area network (WAN), for example, the Internet, a telephone network, a wireless cellular telecommunications network 122, or some combination of these or similar networks.

One or more client devices 118, 120 may be in communication with the video streaming system 100, via the data communication network 112 and/or other network 122. Such client devices may include, for example, one or more laptop computers, desktop computers, "smart" mobile phones, notepad devices, network-enabled televisions, or combinations thereof. Some client devices such as video client 118 may be communicatively coupled to the video streaming system 100 via a router for a LAN, while other clients such as video client 120 may be coupled via a base station for a wireless telephony network 122, or via some other connection or combination of connections. In operation, such client devices 118, 120 may send and receive data or instructions to the system 100, in response to user input received from user input devices or other input. In response, the system 100 may serve video program segments and selected video advertising content to the client devices 118, 120. The devices 118, 120 may output video content from the streaming video programs and video advertising segments using a display screen, projector, or other video output device. In certain embodiments, the system 100 configured in accordance with the features and aspects disclosed herein may be configured to operate within or support a cloud computing environment. For example, a portion of, or all of, the system 100 may reside in a cloud server.

Figure 2:
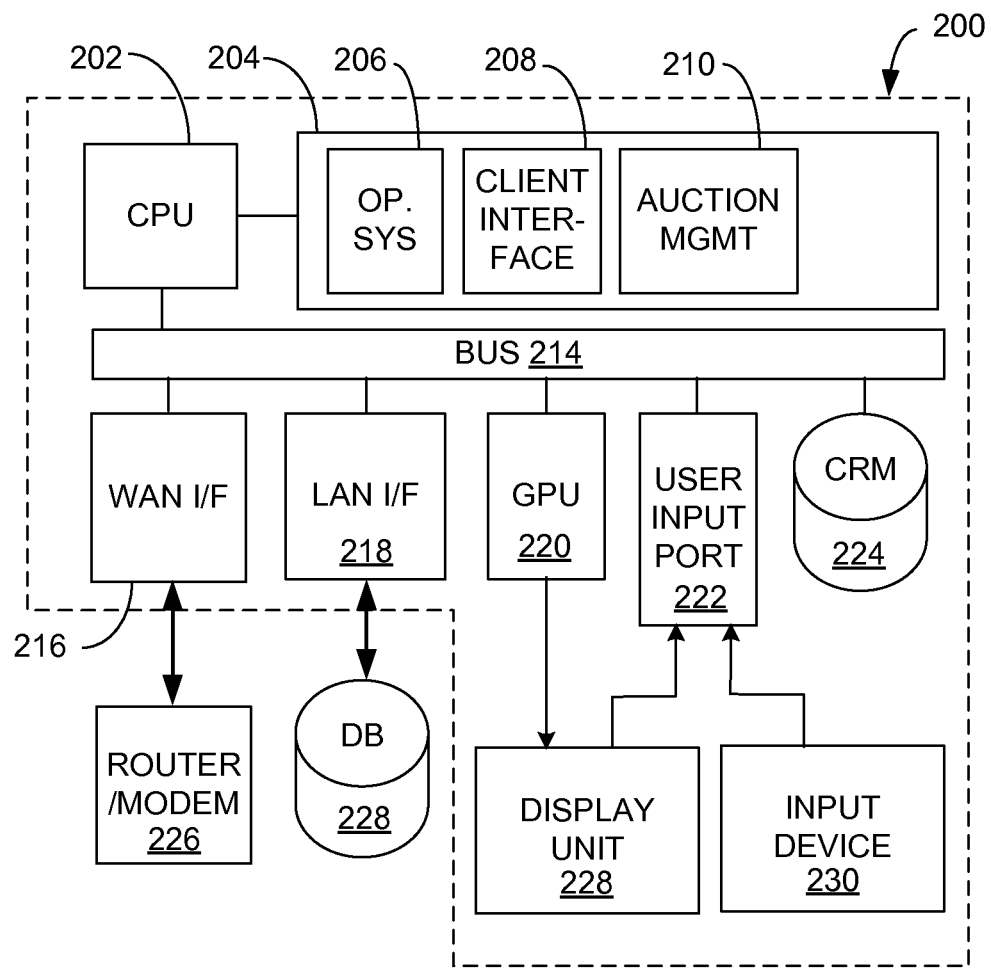
FIG. 2 is a schematic block diagram illustrating an embodiment of a network computing device for supporting and executing the systems and methods described herein.

Referring to FIG. 2, a diagrammatic view of an example ad auction management server 200 is illustrated. For example, the module 110 shown in FIG. 1 may be configured as or include such ad auction management server 200, which may also be referred to as a computer, server, or computer server. In selected embodiments, the ad auction management server 200 may include a processor 202 operatively coupled to a processor memory 204, which holds binary-coded functional modules for execution by the processor 202. Such functional modules may include an operating system 206 for handling system functions such as input/output and memory access, a client interface 208 for communicating with one or more ad buyer clients (e.g., ad buyer 116 as shown in FIG. 1), and an ad auction management module 210 for determining parameters of auction lots of ad inventories based on inventory and viewing data, and on queries received via the client interface module 208.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, and 210 when the ad auction management server 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the ad auction management server 200 to perform one or more operations of a method as described herein.

A communication interface 216 may also be connected to the bus 214. The communication interface 216 may provide or support two-way data communication between the ad auction management server 200 and one or more external devices, e.g., the streaming system 100 or ad buyer node 116, optionally via a router/modem 226 or other connection. In the alternative, or in addition, the ad auction management server 200 may include a Local Area Network (LAN) interface 218 communicatively coupled to a database server 228, from which the server 200 may obtain information regarding ad inventory and historical ad view data categorized by any useful targeted attribute, for processing to define ad auction parameters.

The ad auction management server 200 may be connected (e.g., via the bus 214 and graphics processing unit 220) to a display component 228. A display component 228 may include any suitable configuration for displaying information to a user of the ad auction management server 200. For example, a display component 228 may include or utilize a liquid crystal display (LCD), touchscreen LCD (e.g., capacitive display), light emitting diode (LED) display, projector, cathode ray tube (CRT), or other display device to present information to a user of the ad auction management server 200 in a visual display.

One or more input devices 230 (e.g., an alphanumeric keyboard, microphone, keypad, remote controller, touchscreen, camera or camera array) may be connected to the bus 214 via a user input port 222 to communicate information and commands to the server 200. In selected embodiments, an input device 230 may provide or support control over user selection input, for example, control of a cursor or highlight. Such a selection indicator control device, for example a pointing device, may be configured as a mouse, a trackball, a track pad, touchscreen, cursor direction keys or other device for receiving or tracking physical movement and translating the movement into electrical signals indicating movement of a user selection indicator. The selection indicator control device may be incorporated into the display unit 228, for example using a touch sensitive screen. A selection indicator control device may communicate direction information and command selections to the processor 202 and control selection indicator movement on the display 228.

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

Figure 3:
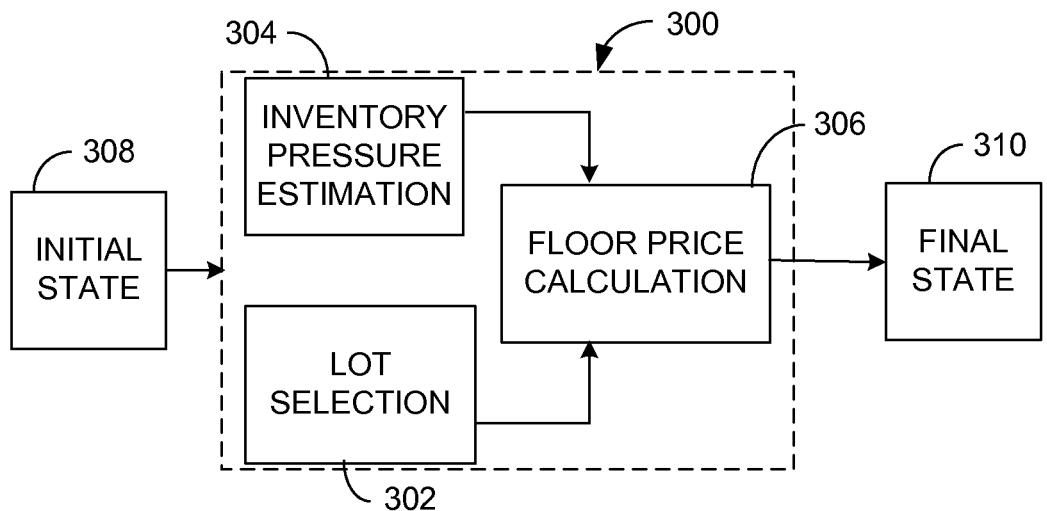
FIG. 3 is a state diagram illustrating general aspects of an auction management process for ad inventory in an online video streaming system.

Referring to FIG. 3, general aspects of an ad auction management process 300 used for transforming parameters of an auction process for ad inventory of an on-line streaming video system are illustrated as a state diagram. The auction management process 300 may include an input-output computation process performed by a computer processor, which operates on the initial state 308 to output the final state 310.

The initial state 308 may represent a null input to an auction process. It should be appreciated that an auction process may be implemented as a process involving a physical transformation of machine states. For example, in an online auction, physical states of participating clients and at least a memory state of an auction process server are changed depending on various inputs, including physical inputs from client machines and data encoded in a memory medium defining properties being auctioned and parameters such as floor prices. Similarly, ad inventory data represents a transformation of historical data for an ad streaming service projected into a future time period. As such, inventory data is derived from historical records or images representing a set of physical states of an ad streaming system at different times, via a definite transformation or mapping. The process 300 may be a precursor for a subsequent auction process, in which a null input state 308 (e.g., an undefined auction lot) is transformed by analysis of the ad inventory data into a defined final state 310, representing an input defining an auction lot of ad inventory and a floor price for the lot. Subsequently, the floor price may be embodied in a physical auction process involving a market medium with independently acting participants.

The ad auction management process 300 may include several interactive modules, for example, a inventory pressure estimation module 304, an auction lot selection module 302 and floor price calculation module 306. The process 300 may include other modules, for example, a user interface module, ad inventory interface module, graphics module, etc., which for illustrative simplicity are not shown.

The auction lot selection module 302 may define one or more auction lots based on parameters of time, user demographic, program type or genre, client device type, or other attributes. The lot selection module 302 may operate in conjunction with an ad inventory estimation module (not shown), which may provide estimates of available (e.g., unsold or unreserved) ad inventory for user-selected inventory segment. Lot selection may include receiving user input via an interface including selection of one or attributes, and displaying an estimated number of ad impressions included in the defined lot. Estimation of ad inventory may be performed using any suitable method, for example, methods as described in the co-pending applications U.S. Ser. No. 13/622,946 filed Sep. 19, 2012 ("Ad Inventory Management System") or U.S. Ser. No. 13/622,984 filed Sep. 19, 2012 ("Estimating Unique Impressions In An Online Video Distribution System"). Once an auction lot is defined, the lot selection module may 304 alert the inventory estimation module, which may reserve a portion of ad impressions equal to the defined auction lot pending completion of a successful auction sale.

The inventory estimation module 304 may estimate a share of voice for each auction lot defined by the lot selection module 302. In addition, the module 304 may estimate an inventory pressure in a market segment corresponding to the auction lot. The corresponding market segment may be defined by all available impressions that match the attributes of the auction lot. As used herein, "inventory pressure" refers to a measure of demand for ads in a defined inventory segment of an ad system. Inventory pressure may be related to share of voice. For example, inventory pressure for a prospective targeted segment may be determined by summing a share of voice for committed (e.g., sold) ad campaigns in the segment, plus a share of voice for the auction lot. The auction lot share of voice may be determined by the ratio of the number of ad impressions in the auction lot to the number of ad impressions in the market segment. The inventory pressure may be determined by a ratio of the sum of committed ads (optionally including the auction lot) to the total number of ads in the market segment.

The floor price calculation module 306 may receive inputs from the lot selection module 302 and the inventory pressure estimation module 304, and use those inputs for determining a floor price for a defined auction lot based on inventory parameters and an estimated inventory pressure for the auction lot. The floor price calculation module 306 may operate an algorithm operating on an inventory pressure estimate input and current valuation data for inventory in the applicable market segment to prepare a floor price to be applied to the auction lot in a subsequent auction process. For example, the floor price may be computed as a step function of the inventory pressure based on a valuation for the corresponding market segment. Various valuation models may be used to value the market segment, for example price information from market survey data, cost plus margin, marginal value adjusted for market saturation, or other methodology. The floor price calculation module 306 may output a data signal indicating a value of the resulting floor price, which may be stored in a computer memory and/or displayed using a computer display device.

Valuation, inventory pressure, and inventory estimation may be adapted in the context of video streaming systems that insert video ads in program content. FIG. 4 is a line diagram illustrating aspects of a video segment timeline 400 including an example of a pattern including ad breaks 406, 408 and 410. A video segment includes video data characterized by a sequence of video frames that are output in order at a defined frame rate to generate video output. As such, a video segment includes an initial or first frame at inception time "$t_0$" 402 of video output, and each subsequent frame is output at a defined time "t" after inception until a terminal or end time "$t_e$" 404. Thus, each frame defines a particular time in the streaming video segment, typically measured from the time of inception. For example, for a video configured for 30 frames per second, the $300^{th}$ frame defines a time 10 seconds after inception. A time point in a streaming video segment may sometime be referred to herein as a "location" in relation to a progress bar, time line or other time indicator.

Any non-negative, integral number of ad breaks 406, 408 and 410 may be configured in the video time line. Each ad break may be defined by a location and duration. For example, the first ad break 406 is located at "$t_0$" and has a duration of "$t_1$-$t_0$"; the second ad break 408 is located at "$t_2$" and has a duration of "$t_3$-$t_2$"; and the third ad break 410 is located at "$t_4$" and has a duration of "$t_5$-$t_4$". The inter-break portions 412, 414 and 416 are used for playing requesting video content, and the ad breaks are used for playing video advertisements. A streaming media player operating on the client device may cause the video content to play in the defined inter-slot portions 412, 414, 416 and stream advertising videos of appropriate duration in all of the ad breaks 406, 408, 410.

FIG. 5 illustrates an example of a call flow 500 between an auction management server 501, an inventory management server 502, and a database server 504 for estimating and managing ad inventory based on a current state of a video streaming system. The servers 501, 502 and 504 may each be, or may include, a computing device including one or more processors coupled to a memory and other components as described in more detail herein, or as known in the art. As prelude to the call flow 500, an example of call flow for video streaming provided by a video streaming server through a web page interface and streaming media players installed at numerous client devices is first described without reference to a figure. The inventive concepts herein are not limited to such environments.

If a web page environment is used, a call flow may initiate with the client devices (not shown) displaying a web (e.g., World Wide Web) page received from a video streaming system (also not shown) including links for requesting one or more video segments. For example, the web page may comprise a "home" or personalized page including a list of selected video segments of general interest, or selected as likely to be of interest to a specific user based on a user profile. The client device may receive user input selecting one of the links, for example, a "point and click" input from a pointing device, a touch input on a touchscreen device, or a spoken command. In response to the input, the client device may request a specific video segment by transmitting a Hypertext Transfer Protocol (HTTP) "get" request, or other suitable request message, to the video streaming system.

In response to receiving the request message, the video streaming system may determine a selection of advertising videos and ad breaks for the video segment requested by the request message. In so doing, the server system may access a record pertaining to user preferences or past activity by a user identified, for example by a user account, as making the request for the video segment. Any suitable method may be used to select the video advertisements, which may include consideration of user input and related communication between each client and the video streaming server. An output of the determining process may include video ad identifiers included in streaming data.

The streaming video system may stream the video segment configured with video advertising. The client device may play the streaming video segment configured with video advertising at designated ad breaks using a media player component. Video advertisements may be selected by the streaming video system just prior to each ad break being encountered at the client, or in advance of initiation of a streaming session. Each client device may play each streaming video until reaching one or more designated ad breaks. In some embodiments clients may request a video ad in response to detecting the beginning of a designated ad break, such as, for example, about five seconds before reaching the ad break during play of a streaming video. An ad server of the video streaming system may serve the video ad to clients in response to each request. In alternative embodiments, an ad server may automatically select and include a streaming video ad in the content streamed to the client device, without responding to a request from the client for a video ad. When each client has finished playing an ad, it may transmit an end beacon to an ad server.

Upon receiving each such end beacon, the ad server may create a record including at least an identifier for the program and video ad, and time the end beacon was received. In addition, the record may include a user or session identifier and other information. The ad server may continually provide such records to the database server 504 operating an ad tracking process 506. Using a relational data structure, each end beacon event record may thereby be related, via included program, user, or session identifiers to one or more targeted attributes, for example, demographic or geographic parameters, device type, or program genre. The database server 504 may maintain all such records in a data structure, or compress the records using a counting process to keep a more limited set of counting data of ad impressions for each targeted attribute and program, in particular time increments.

Periodically, or in response to defined events, the inventory management server 502 may update a time model used for forecasting ad inventory. As part of an update, the server 502 may perform historical querying 508 and obtain requested historical ad viewing data 510 from the database server 504. The inventory management server 502 may test a current forecasted model against historical data, and adjust (update)

parameters of the forecasted model 512, so that the model better matches historical measured results for recent comparable time periods.

At initiation of a process for defining an auction lot, an auction management server 501 may receive user input for an auction lot selection process 516, and generating an inventory query for a market segment defined by user input. The server 510 may transmit 518 the inventory query to the inventory management server 502. In response, the server 502 may process the request 520 using query parameters (e.g., attributes of targeted viewers, geographic area, program attributes, device attributes and time period) using the most current forecasted model to obtain a resulting market segment and inventory estimate, which it may provide 522 to the auction management server 501. The market segment and inventory may include an estimate of a total number of impressions in the market segment, and a number of available (unsold or unreserved) impressions in the market segment that are available for including in an auction lot.

The auction management server 501 may calculate 524 a inventory pressure for the inventory segment defined by the lot selection process 516. At 526, the auction management server 501 may calculate a floor price for the auction lot, using an algorithm as described herein. At 528, the server 501 may output a display of results of the processes 524, 526 defining a floor price for an auction lot, and/or store the result in a computer memory. Subsequently, the auction management server 501 may provide the results 530 to a separate auction process. Thus, processes at the server 502 may be used manage the floor price and definition of auction lots to be auctioned in a separate auction process.

Figure 6:
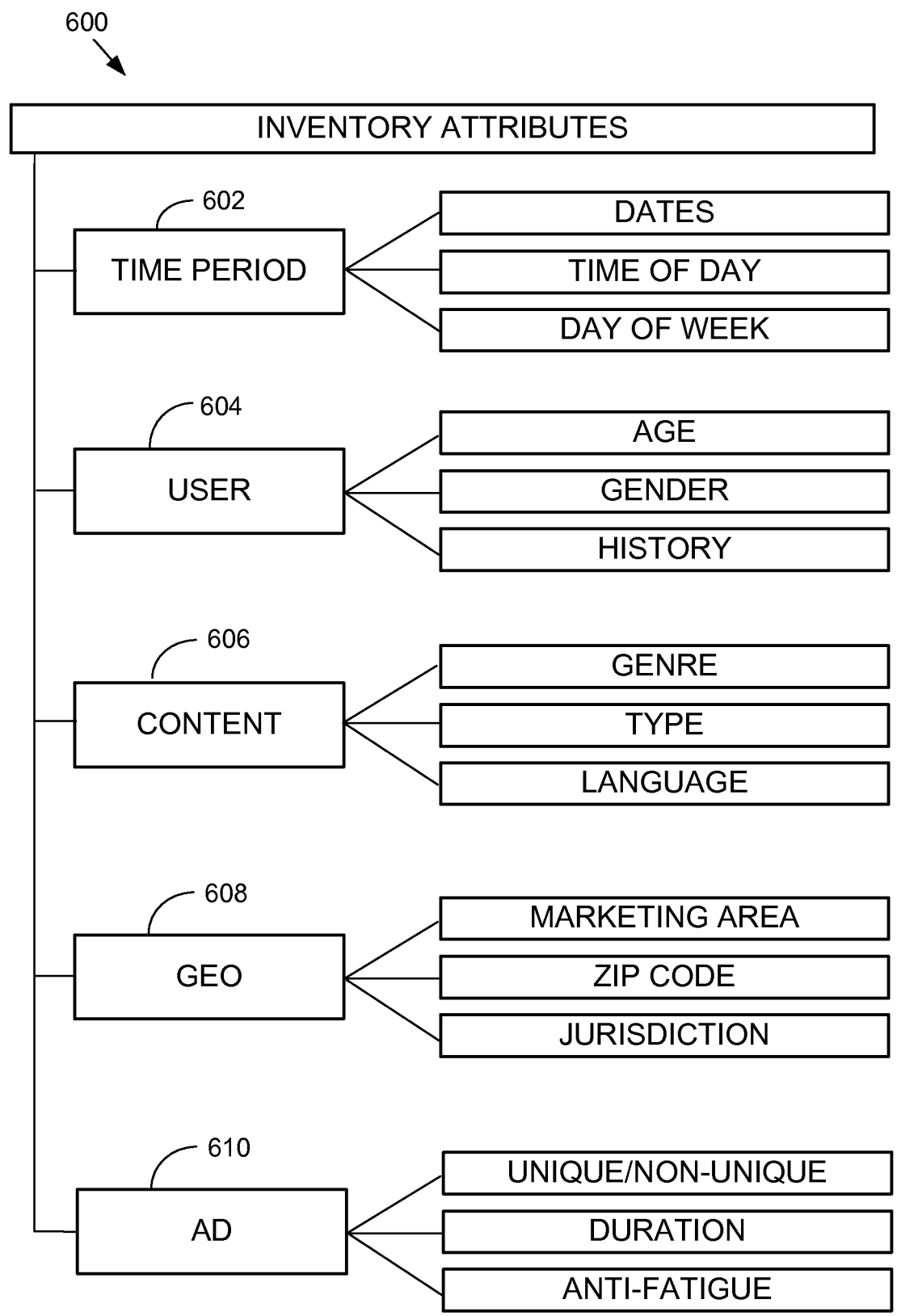
FIG. 6 is a block diagram illustrating attribute categories such as may be used for defining auction lots of ad inventories, and related operations.

An aspect of defining auction lots and market segments may include defining a set of attributes that may be of interest to advertisers for targeting video advertising. Such attributes may include any information useful to defining circumstances under which a video ad may be served to client devices and displayed as advertising output. Examples of different inventory attributes 600 are shown in FIG. 6. It should be appreciated that the attributes 600 outlined by FIG. 6 are merely examples, and do not constrain the attributes that may be used to define auction lots or floor prices. Inventory attributes may include attributes defining a time period 602 during which video ads in the inventory will be served to client devices. The time period attributes 602 may include, for example, start dates and end dates for an ad campaign, times of day in which the ads will be served, and/or days of the week during which the ads will be served.

The inventory attributes 600 may further include user attributes 604, including but not limited to demographic attributes. The user attributes 604 may include, for example, profile or apparent age, and profile or apparent gender. "Profile" age or gender refers to the user age or gender as determined from a user profile, and "apparent" age or gender refers to an age or gender inferred from a user's past viewing habits or history. Apparent traits may be useful for handling unidentified or unregistered users. User attributes may include additional attributes such as, for example, educational level or profession.

The inventory attributes 600 may further include content attributes 606. Content attributes 606 may include anything descriptive of content with which the video advertising will be presented, for example, program genre, program type, and program language. Genres may include, for example, documentaries, dramas, comedies, reality shows, and so forth. Program types may include, for example, short clip, half-hour episode, motion picture, and so forth.

The inventory attributes 600 may further include geographic attributes 608, for example, marketing area, zip code, jurisdiction (e.g., country, state or province), latitude/longitude, or other information defining a location of client devices on which an ad is to be presented. The inventory attributes 600 may further include ad attributes 610, defining limitations placed on presentation of video ads in a auction lot. Such attributes may include, for example, whether or not each ad impression is presented to a unique user, because an ad presented multiple times to the same user may have a different effectiveness that the same ad presented only once to multiple users. Thus, a market segment and/or auction lot may be defined by a number of unique impressions and also by a number of non-unique (i.e., total) impressions. Ad attributes 610 may further include, for example, the ad duration and anti-fatigue attributes specifying a maximum rate of presenting the same ad on the same client device. The inventory attributes 600 may include further attributes not shown in FIG. 6, for example, types of client devices on which the video ad is presented.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

EXAMPLE METHODOLOGIES AND APPARATUS

As shown in FIG. 7, a computer may perform a method 700 for defining an auction lot based on one or more attributes used for tracking video ads in an online video streaming system. The method 700 may be performed by an auction management server or other components of a streaming video system prior to determining a floor price for the auction lot. The method 700 may include, at 710, tracking ad impressions in relation to detected attributes. For example, an ad tracking component may generate and maintain records of attributes associated with each past ad impression detected by the streaming video system.

The method 700 may further include, at 720, extrapolating historical data over future time period based on program schedule, assuming continuation of past user behaviors. This may include, for example, constructing a time dependent model of expected future program views (and/or ad impressions) for each video program available for viewing, or anticipated to be available for viewing, via the streaming video system. Further details of suitable model building may be found, for example, in the co-pending patent applications referenced above.

The method 700 may further include, at 730, determining total ad impressions anticipated in a targeted market segment for a defined future time period. The targeted market segment may be defined using one or more attributes as described herein. A sophisticated analysis may be used to accurately account for inter-dependencies among different attributes, in arriving at a determination of total ad impressions. Suitable methods for determining total ad impressions may include, for example, methods as disclosed in the co-pending patent applications referenced above.

The method 700 may further include, at 740, determining an available number of impressions in the targeted marketing segment. For example, available impressions may be equated to a number of unsold impressions, or a number of impressions less some reserved amount. The method 700 may further include, at 750, defining the auction lot as some number of impressions in the targeted segment that is not greater than the available number of impressions. An administrator may define a number of impressions that, based on past experience, is likely to attract multiple bidders in the anticipated auction system.

As shown in FIG. 8, a computer server system may perform a method 800 for defining a floor price in a lot of ad inventory defined for an auction process. The method 800 may include, at 810, receiving, by a computer, a request for an auction lot of video advertisements within an inventory segment of video ad inventory for distribution with one or more episodes of one or more video programs via a streaming video system. For example, a floor price determination module may receive information defining an auction lot from another component of an ad streaming system performing more detailed operations for defining an auction lot, such as described above in connection with FIG. 7, and/or below in connection with FIG. 9.

The method 800 may further include, at 820, determining, in a memory of the computer, a measure of inventory pressure for the auction lot in response to receiving the request, based on an aggregate share of voice for one or more ad campaigns allocated to the inventory segment. For example, a share of voice for each committed and/or prospective auction lot of ads may be determined by the relation $S=N_a/(N_m+N_e)$, wherein S is the share of voice, $N_a$ is the number of impressions in the auction lot, $N_m$ is the number of impressions in the market segment of the tracked streaming video system, and $N_e$ is either zero, or a non-zero estimate of impressions in the market segment external to the streaming video system, to obtain multiple shares of voices. In the alternative, the share of voice may be calculated relative to some larger segment. For example, by the relation $N_a/N_{m+}$, wherein $N_{m+}$ is a market segment defined by some but not all attributes of the auction lot. The inventory pressure, may then be determined by aggregating the multiple shares of voice, for example by summation. In the alternative, the inventory pressure/aggregate share of voice may be determined by computing a ratio of all committed ads (optionally including prospective auction ads) in the market segment to a total number of ad opportunities in the segment. It should be apparent that the inventory pressure for a market segment may refer to the same quantity (i.e., may be equal to) the aggregate share of voice for all committed and auctioned ads in the segment.

The method 800 may further include, at 830, calculating a floor price for the auction lot based on the measure of inventory pressure. For example, the computer may determine an aggregate market price for the market segment, for example, an average, median, minimum, or maximum price, per impression. The floor price may be determined as a continuous linear function of the market value and the inventory, for example by $P=K \cdot S \cdot N_a \cdot P_m$, wherein P is the floor price, K is some constant factor, S is the inventory pressure, $N_a$ is the number of impressions in the auction lot, and $P_m$ is the estimated market price for the segment, per impression. In the alternative, a continuous function of this type may be approximated by a step function, to reduce variability in floor prices as a function of inventory pressure. It should be appreciated that the factors S, $N_a$ and $P_m$ may vary depending on the targeted market segment and size of the auction lot, and that other factors or functions may be used if desired.

The method may further include, at 840, providing information defining the floor price and the auction lot to an auction system. For example, the computer may store data recording the floor price and parameters of the auction lot in a computer memory, and/or transmit the data to a server operating an auction process.

With reference to FIGS. 9-12, several additional operations 900, 1000, 1100 and 1200 are depicted for managing an auction process for ad inventory in a streaming video system, which may be performed by a computer server, alone or in combination with a client device and/or another server. One or more of operations 900, 1000, 1100 and 1200 may optionally be performed as part of method 800. The elements 900, 1000, 1100 and 1200 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 800 includes at least one of the operations 900, 1000, 1100 and 1200, then the method 800 may terminate after the at least one operation, without necessarily having to include any subsequent downstream operation(s) that may be illustrated.

In an aspect, with reference to FIG. 9, the method 800 may further include additional operations 900 for defining the auction lot. The additional operations may include, at 910, defining the auction lot based on a total number of impressions within a specified time period and on targeting attribute data defining the inventory segment. In an aspect, the computer may calculate a projected unsold inventory of video advertisements in a defined future period, for a designated market segment. For example, a computer may apply a modeling process and inventory estimation process as described above in connection with FIG. 7. Then, the computer may subtract sold inventory from the market segment to obtain unsold inventory in the segment, and select the auction lot for the unsold inventory. For example, the computer may automatically select the auction lot using a selection algorithm.

The method 800 may further include, at 920, determining the aggregate share of voice, comprising estimating a projected total number of ad impressions in the inventory segment during the specified time period, based upon electronic viewership records for past episodes of the one or more video programs in the streaming video system. In an aspect, estimating the projected total number of ad impressions in the inventory segment during the specified time period may include, at 930, querying a database of electronic viewership records. In another aspect, determining the aggregate share of voice may further include, at 940, estimating a number of ad impressions that will be allocated to each of the one or more ad campaigns in the inventory segment during the specified time period.

In another aspect of the method, determining the measure of inventory pressure may include, at 950, calculating a ratio A/B, wherein 'A' indicates a sum of the number of ad impressions that will be allocated to each of the one or more ad campaigns in the inventory segment during the specified time period, and 'B' indicates the projected total number of ad impressions in the inventory segment during the specified time period. As shown in FIG. 10 at 1010, determining the measure of inventory pressure may further include calculating the ratio A/B to be a numeric value within a range of zero to at least one, wherein zero indicates there is no competing demand for the inventory segment, one indicates there is no uncommitted inventory in the inventory segment, and a number greater than one indicates the inventory segment is oversold.

With reference to FIG. 11, the method 800 may further include additional operations 1100 for calculating a floor price. The method 800 may include, at 1110, calculating the floor price as a numeric function of the inventory pressure. For example, as shown at 1120, the numeric function may be, or may include, a step function. In another aspect, the method may include, at 1130, calculating the floor price as a numeric function of the inventory pressure and the aggregate market price for the inventory segment. In such case, the method may include, at 1140, determining an aggregate market price in the inventory segment, based on records of past sales.

Examples of specific functions have been provided herein above. For example, a step function may be defined to approximate a linear continuous function of the form $P=K \cdot S \cdot N_a \cdot P_m$, wherein P is the floor price, K is some constant factor, S is the inventory pressure, $N_a$ is the number of impressions in the auction lot, and $P_m$ is an estimated baseline market price for the segment, per impression. For further example, the step function may be configured to approximate a non-linear continuous function, for example an exponential function of the inventory pressure. A general feature of these functions should be that floor price increases with inventory pressure. For example, supposing that a baseline price 'A' is given by $N_a \cdot P_m$, a simple step price function may be defined by setting the floor price equal to '0.5 A' for inventory pressure values less than 0.3, to '0.8 A' for inventory pressure values in the range of 0.3 to 0.6, and to 'A' for inventory pressure values greater than 0.6.

Figure 12:
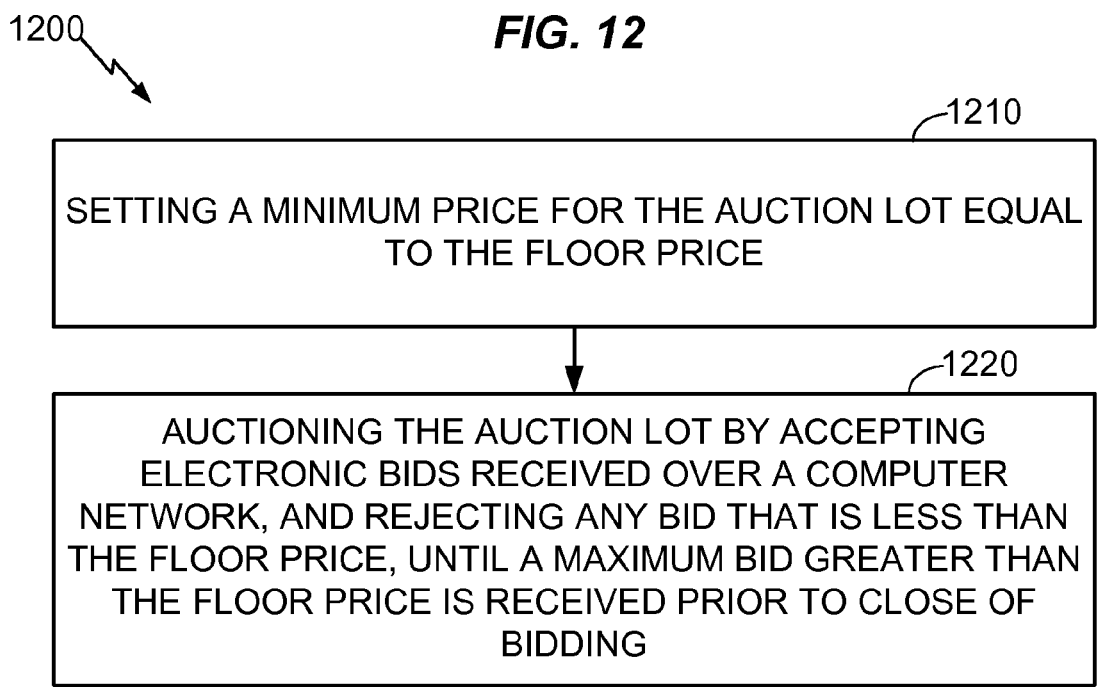

In aspects, with reference to FIG. 12, the method 800 may further include additional operations 1200 for operating an auction according to parameters determined by other operations of the method 800. The additional operations may include, at 1210, setting a minimum price for the auction lot equal to the floor price, for example using an on-line auction system. In such case, the method 800 may further include, at 1220, auctioning the auction lot by accepting electronic bids received over a computer network, and rejecting any bid that is less than the floor price, until a maximum bid greater than the floor price is received prior to close of bidding.

Figure 13:
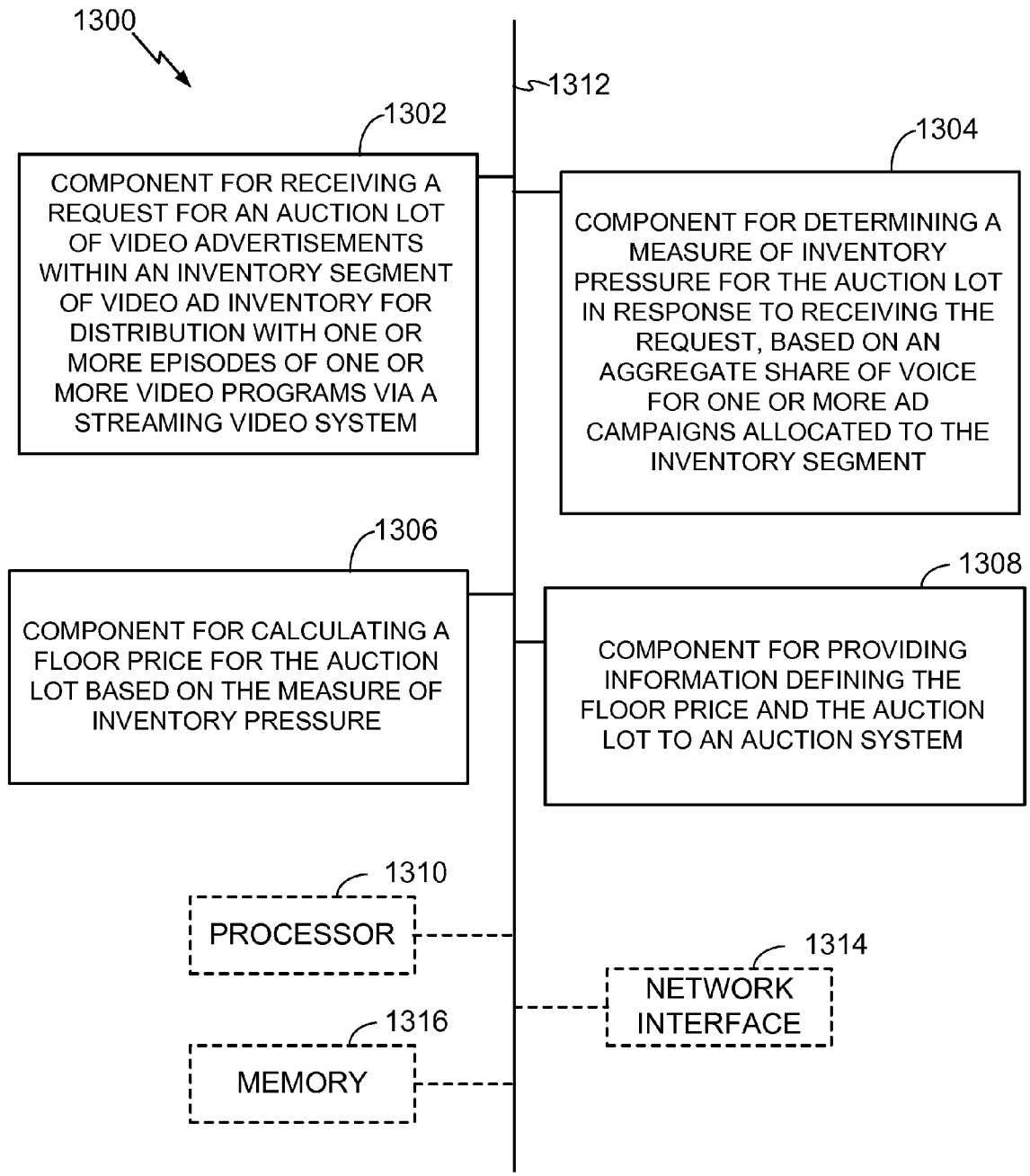
FIG. 13 is a diagram illustrating a computer server configured for managing an auction of ad inventory for a video streaming system, including determining a floor price.

With reference to FIG. 13, there is provided an exemplary apparatus 1300 that may be configured as computer server, client device, or combination of client and server, for managing an auction process by defining parameters of an action lot of video advertising in a video streaming system. The apparatus 1300 may include functional blocks that can represent functions implemented by a processor, software, or combination thereof (e.g., firmware).

As illustrated, in one embodiment, the apparatus 1300 may include an electrical component or means 1302 for receiving a request for an auction lot of video advertisements within an inventory segment of video ad inventory for distribution with one or more episodes of one or more video programs via a streaming video system. For example, the electrical component or means 1302 may include at least one control processor 1310 coupled to a memory component 1316. The control processor may operate an algorithm, which may be held as program instructions in the memory component. The algorithm may include, for example, receiving an electronic message from an electronic component, and processing the message to identify an identifier for an auction lot, a number of advertisements in the auction lot, and parameters defining or identifying a market segment within the video ad streaming system. To obtain the information defining the auction lot, the electronic component may perform more detailed operations such as described above in connection with FIG. 7. In the alternative, the auction lot may be determined using another suitable method.

The apparatus 1300 may further include an electrical component or module 1304 for determining a measure of inventory pressure for the auction lot in response to receiving the request, based on an aggregate share of voice for one or more ad campaigns allocated to the inventory segment. For example, the electrical component or means 1304 may include at least one control processor 1310 coupled to a memory component 1316. The control processor may operate an algorithm, which may be held as program instructions in the memory component. The algorithm may include, for example, determining the share of voice for ad campaigns or orders in the market segment by the relation $S=N_a/(N_m+N_e)$, wherein S is the share of voice, $N_a$ is the number of impression in the auction lot, $N_m$ is the number of impressions in the market segment of the tracked streaming video system, and $N_e$ is either zero, or a non-zero estimate of impressions in the market segment external to the streaming video system. Then, the algorithm may include calculating the inventory by aggregating the computed shares of voice to determine an aggregate share of voice, for example by summation. In the alternative, the algorithm may include calculating an inventory pressure by calculating a ratio A/B, wherein 'A' indicates a sum of the number of ad impressions that will be allocated to each of the one or more ad campaigns in the inventory segment during the specified time period, and 'B' indicates the projected total number of ad impressions in the inventory segment during the specified time period.

The apparatus 1300 may further include an electrical component or module 1306 for calculating a floor price for the auction lot based on the measure of inventory pressure. For example, the electrical component or means 1306 may include at least one control processor 1310 coupled to a memory component 1316. The control processor may operate an algorithm, which may be held as program instructions in the memory component. The algorithm may include, for example, determining an average, median, minimum, or maximum market price realized in past sales within the market segment, per ad impression. The algorithm may further include determining the floor price as a function of the market value and the share of voice, for example by $P=K \cdot S \cdot N_a \cdot P_m$, wherein P is the floor price, K is some constant factor, S is the inventory pressure, $N_a$ is the number of impressions in the auction lot, and $P_m$ is the estimated market price for the segment, per impression. In the alternative, the algorithm may include determining a floor price as a step function of the inventory pressure, as described in more detail herein above.

The apparatus 1300 may further include an electrical component or module 1308 for providing information defining the floor price and the auction lot to an auction system. For example, the electrical component or means 1308 may include at least one control processor 1310 coupled to a memory component 1316. The control processor may operate an algorithm, which may be held as program instructions in the memory component. The algorithm may include, for example, storing the floor price and parameters defining the action lot in a memory location accessible to an independent auction process, and/or transmitting the floor price and parameters to a server for the auction process.

The apparatus 1300 may include similar electrical components for performing any or all of the additional operations 900, 1000, 1100 and 1200 described in connection with FIGS. 9-12, which for illustrative simplicity are not shown in FIG. 13.

In related aspects, the apparatus 1300 may optionally include a processor component 1310 having at least one processor, in the case of the apparatus 1300 configured as a network entity. The processor 1310, in such case may be in operative communication with the components 1302-1308 or similar components via a bus 1312 or similar communication coupling. The processor 1310 may effect initiation and scheduling of the processes or functions performed by electrical components 1302-1308.

In further related aspects, the apparatus 1300 may include a network interface component 1314 enabling communication between network nodes. The apparatus 1300 may optionally include a component for storing information, such as, for example, a memory device/component 1316. The computer readable medium or the memory component 1316 may be operatively coupled to the other components of the apparatus 1300 via the bus 1312 or the like. The memory component 1316 may be adapted to store computer readable instructions and data for implementing the processes and behavior of the components 1302-1308, and subcomponents thereof, or the processor 1310, or the methods disclosed herein. The memory component 1316 may retain instructions for executing functions associated with the components 1302-1308. While shown as being external to the memory 1316, it is to be understood that the components 1302-1308 can exist within the memory 1316.

It should be understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical discs or magnetic disks, such as used in a data storage device or medium. Volatile media may include dynamic memory, such as a main or cache memory for a computer processor. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, solid-state drive (SSD), or any other memory card, chip, or cartridge, or any other memory medium from which a computer can read.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   receiving, by a computer, a request for an auction lot of video advertisements within an inventory segment of video ad inventory for distribution with one or more episodes of one or more video programs via a streaming video system;
   estimating, by the computer, a first share of voice for a number of ad impressions that are committed to one or more ad campaigns in the inventory segment when the inventory segment includes a first portion for committed ad campaigns and a second portion of auctioned ad campaigns;
   estimating, by the computer, a second share of voice for a number of ad impressions that are projected to be allocated to one or more ad campaigns in the auction lot during a specified time period when the inventory segment includes the first portion for committed ad campaigns and the second portion of auctioned ad campaigns;
   estimating, by the computer, an aggregate share of voice for one or more ad campaigns allocated to the inventory segment using the first share of voice and the second share of voice;
   determining, by the computer, a measure of inventory pressure for the auction lot in response to receiving the request, based on the aggregate share of voice for the one or more ad campaigns allocated to the inventory segment;

calculating, by the computer, a floor price for the auction lot based on the measure of inventory pressure; and providing, by the computer, information defining the floor price and the auction lot to an auction system.

2. The method of claim 1, further comprising defining the auction lot based on a total number of impressions within the specified time period and on targeting attribute data defining the inventory segment.

3. The method of claim 2, wherein estimating the aggregate share of voice comprises estimating a projected total number of ad impressions in the inventory segment during the specified time period, based upon electronic viewership records for past episodes of the one or more video programs in the streaming video system.

4. The method of claim 3, wherein estimating the projected total number of ad impressions in the inventory segment during the specified time period comprises querying a database of the electronic viewership records.

5. The method of claim 3, wherein estimating the aggregate share of voice further comprises estimating a number of ad impressions that will be allocated to each of the one or more ad campaigns in the inventory segment during the specified time period.

6. The method of claim 4, wherein determining the measure of inventory pressure comprises calculating a ratio A/B, wherein 'A' indicates a sum of the number of ad impressions that will be allocated to each of the one or more ad campaigns in the inventory segment during the specified time period, and 'B' indicates the projected total number of ad impressions in the inventory segment during the specified time period.

7. The method of claim 6, wherein determining the measure of inventory pressure comprises calculating the ratio A/B to be a numeric value within a range of zero to at least one, wherein zero indicates there is no competing demand for the inventory segment, one indicates there is no uncommitted inventory in the inventory segment, and a number greater than one indicates the inventory segment is oversold.

8. The method of claim 1, wherein calculating the floor price further comprises calculating the floor price as a numeric function of the inventory pressure.

9. The method of claim 8, wherein the numeric function comprises a step function.

10. The method of claim 6, wherein calculating the floor price further comprises determining an aggregate market price in the inventory segment, based on records of past sales.

11. The method of claim 10, wherein calculating the floor price further comprises calculating the floor price as a numeric function of the inventory pressure and the aggregate market price for the inventory segment.

12. The method of claim 1, further comprising setting a minimum price for the auction lot equal to the floor price.

13. The method of claim 12, further comprising auctioning the auction lot by accepting electronic bids received over a computer network, and rejecting any bid that is less than the floor price, until a maximum bid greater than the floor price is received prior to close of bidding.

14. An apparatus, comprising at least one processor configured for:

receiving a request for an auction lot of video advertisements within an inventory segment of video ad inventory for distribution with one or more episodes of one or more video programs via a streaming video system;

estimating a first share of voice for a number of ad impressions that are committed to one or more ad campaigns in the inventory segment when the inventory segment includes a first portion for committed ad campaigns and a second portion of auctioned ad campaigns;

estimating a second share of voice for a number of ad impressions that are projected to be allocated to one or more ad campaigns in the auction lot during a specified time period when the inventory segment includes the first portion for committed ad campaigns and the second portion of auctioned ad campaigns;

estimating an aggregate share of voice for one or more ad campaigns allocated to the inventory segment using the first share of voice and the second share of voice;

determining a measure of inventory pressure for the auction lot in response to receiving the request, based on the aggregate share of voice for the one or more ad campaigns allocated to the inventory segment;

calculating a floor price for the auction lot based on the measure of inventory pressure;

providing information defining the floor price and the auction lot to an auction system; and a memory coupled to the at least one processor for storing data.

15. The apparatus of claim 14, wherein the processor is further configured for defining the auction lot based on a total number of impressions within the specified time period and on targeting attribute data defining the inventory segment.

16. The apparatus of claim 15, wherein estimating the aggregate share of voice comprises estimating a projected total number of ad impressions in the inventory segment during the specified time period, based upon electronic viewership records for past episodes of the one or more video programs in the streaming video system.

17. The apparatus of claim 16, wherein the processor is further configured for estimating the projected total number of ad impressions in the inventory segment during the specified time period at least in part by querying a database of the electronic viewership records.

18. The apparatus of claim 14, wherein estimating the aggregate share of voice comprises estimating a number of ad impressions that will be allocated to each of the one or more ad campaigns in the inventory segment during the specified time period.

19. The apparatus of claim 18, wherein the processor is further configured for determining the measure of inventory pressure at least in part by calculating a ratio A/B, wherein 'A' indicates a sum of the number of ad impressions that will be allocated to each of the one or more ad campaigns in the inventory segment during the specified time period, and 'B' indicates the projected total number of ad impressions in the inventory segment during the specified time period.

20. The apparatus of claim 19, wherein the processor is further configured for determining the measure of inventory pressure at least in part by calculating the ratio A/B to be a numeric value within a range of zero to at least one, wherein zero indicates there is no competing demand for the inventory segment, one indicates there is no uncommitted inventory in the inventory segment, and a number greater than one indicates the inventory segment is oversold.

21. The apparatus of claim 14, wherein the processor is further configured for calculating the floor price as a numeric function of the inventory pressure.

22. The apparatus of claim 14, wherein the processor is further configured for calculating the floor price as a numeric function of the inventory pressure and an aggregate market price for the inventory segment.

23. The apparatus of claim 22, wherein the processor is further configured for determining the aggregate market price in the inventory segment, based on records of past sales.

24. The apparatus of claim 14, wherein the processor is further configured for setting a minimum price for the auction lot equal to the floor price.

25. The apparatus of claim 24, wherein the processor is further configured for auctioning the auction lot by accepting electronic bids received over a computer network, and rejecting any bid that is less than the floor price, until a maximum bid greater than the floor price is received prior to close of bidding.

26. A computer program product, comprising:
- a non-transitory computer-readable medium holding coded instructions, that when executed by a processor, cause a computer to perform the operations of:
- receiving a request for an auction lot of video advertisements within an inventory segment of video ad inventory for distribution with one or more episodes of one or more video programs via a streaming video system;
- estimating, by the computer, a first share of voice for a number of ad impressions that are committed to one or more ad campaigns in the inventory segment when the inventory segment includes a first portion for committed ad campaigns and a second portion of auctioned ad campaigns;
- estimating, by the computer, a second share of voice for a number of ad impressions that are projected to be allocated to one or more ad campaigns in the auction lot during a specified time period when the inventory segment includes the first portion for committed ad campaigns and the second portion of auctioned ad campaigns;
- estimating an aggregate share of voice for one or more ad campaigns allocated to the inventory segment using the first share of voice and the second share of voice;
- determining a measure of inventory pressure for the auction lot in response to receiving the request, based on the aggregate share of voice for the one or more ad campaigns allocated to the inventory segment;
- calculating a floor price for the auction lot based on the measure of inventory pressure; and
- providing information defining the floor price and the auction lot to an auction system.

* * * * *